US011390383B2

(12) United States Patent
Bajorat et al.

(10) Patent No.: US 11,390,383 B2
(45) Date of Patent: Jul. 19, 2022

(54) STOWAGE AND REMOVAL SYSTEM FOR ROLLABLE CONTAINERS IN A VEHICLE, AND A VEHICLE, IN PARTICULAR A COMMERCIAL AIRCRAFT, WITH SUCH A SYSTEM

(71) Applicant: Airbus Operations GmbH, Hamburg (DE)

(72) Inventors: Falk Bajorat, Hamburg (DE); Philipp Seitz, Hamburg (DE); Martin Bocek, Hamburg (DE)

(73) Assignee: Airbus Operations GmbH

( * ) Notice: Subject to any disclaimer, the term of this patent is extended or adjusted under 35 U.S.C. 154(b) by 370 days.

(21) Appl. No.: 16/047,371

(22) Filed: Jul. 27, 2018

(65) Prior Publication Data

US 2019/0031348 A1     Jan. 31, 2019

(30) Foreign Application Priority Data

Jul. 31, 2017   (DE) ..................... 10 2017 117 293.9
Jul. 27, 2018   (EP) ..................... 18185981

(51) Int. Cl.
*B64D 9/00*     (2006.01)
*B64D 11/04*    (2006.01)
*B64D 11/00*    (2006.01)

(52) U.S. Cl.
CPC ............ *B64D 9/00* (2013.01); *B64D 11/0007* (2013.01); *B64D 11/04* (2013.01); *B64D 11/00* (2013.01)

(58) Field of Classification Search
CPC ...... B64D 9/00; B64D 11/0007; B64D 11/04; B64D 11/00

(Continued)

(56) References Cited

U.S. PATENT DOCUMENTS 3,737,010 A * 6/1973 Nelson ............... B64D 11/0007
                                                    188/32
5,465,660 A * 11/1995 Conti ................. B64D 11/0007
                                                    100/48

(Continued)

FOREIGN PATENT DOCUMENTS

DE   10 2015 102 315 A1    8/2016
EP       2 492 196 A2      8/2012

(Continued)

OTHER PUBLICATIONS

Extended European Search Report including the Written Opinion for Application No. EP 18185981.0 dated Sep. 24, 2018, 11 pages.

*Primary Examiner* — Jeffrey A Shapiro
(74) *Attorney, Agent, or Firm* — Lerner, David, Littenberg, Krumholz & Mentlik, LLP

(57) ABSTRACT

A stowage and removal system has a receiving frame with an insertion opening for insertion and removal of a container and with a first wall lying opposite the insertion opening; at least one first locking device for releasably locking a container arranged in the receiving frame at the first wall; a first control element for actuating the at least one first locking device; a removal device with a first engagement body which can be brought into engagement with a side of a container directed towards the first wall, wherein the removal device is configured to move the first engagement body from a region near the wall in the direction of the insertion opening, and a removal control element which is coupled to the removal device for selectively moving the first engagement body. The first control element and the removal control element are arranged in a region of the insertion opening.

19 Claims, 9 Drawing Sheets

(58) Field of Classification Search
USPC .......................................................... 186/45
See application file for complete search history.

(56) References Cited

U.S. PATENT DOCUMENTS

| | | | | |
|---|---|---|---|---|
| 9,821,911 B2* | 11/2017 | Wallbott | ................... | B25J 1/08 |
| 10,604,258 B2* | 3/2020 | Singleton | ........... | B64D 11/0007 |
| 2005/0178910 A1* | 8/2005 | Sprenger | ............. | B64D 11/0624 |
| | | | | 244/118.6 |
| 2007/0131462 A1* | 6/2007 | Hemsley | ................. | B60L 50/60 |
| | | | | 180/19.3 |
| 2010/0140890 A1* | 6/2010 | Boivin | .................... | B62B 3/004 |
| | | | | 280/47.34 |
| 2012/0006941 A1* | 1/2012 | Tan | ......................... | B64D 11/04 |
| | | | | 244/118.5 |
| 2012/0217342 A1* | 8/2012 | Tan | ......................... | B64D 11/04 |
| | | | | 244/118.5 |
| 2012/0328364 A1* | 12/2012 | Tkocz | .................... | B64D 11/04 |
| | | | | 403/322.4 |
| 2013/0257065 A1* | 10/2013 | Burd | ....................... | E05C 1/065 |
| | | | | 292/175 |
| 2013/0259612 A1* | 10/2013 | Guering | .................. | B64D 11/04 |
| | | | | 414/260 |
| 2014/0062102 A1* | 3/2014 | Grant | ....................... | E05B 41/00 |
| | | | | 292/161 |
| 2014/0152027 A1* | 6/2014 | Burd | ....................... | E05C 19/009 |
| | | | | 292/200 |
| 2014/0166806 A1* | 6/2014 | Durand | .................. | B64D 11/04 |
| | | | | 244/118.1 |
| 2016/0288898 A1* | 10/2016 | Rechert | .................... | B64C 1/24 |
| 2017/0166310 A1* | 6/2017 | Wallbott | ................. | B64D 11/04 |
| 2017/0369170 A1 | 12/2017 | Sieben | | |
| 2018/0118325 A1* | 5/2018 | Singleton | ................ | E06C 1/005 |

FOREIGN PATENT DOCUMENTS

| | | |
|---|---|---|
| EP | 2743182 A2 | 6/2014 |
| WO | 2014/125046 A1 | 8/2014 |
| WO | 2016/034531 A1 | 3/2016 |
| WO | 2016/142328 A1 | 9/2016 |

* cited by examiner

STOWAGE AND REMOVAL SYSTEM FOR ROLLABLE CONTAINERS IN A VEHICLE, AND A VEHICLE, IN PARTICULAR A COMMERCIAL AIRCRAFT, WITH SUCH A SYSTEM

FIELD OF THE INVENTION

The invention relates to a stowage and removal system for rollable containers in a vehicle, and to a vehicle, in particular a commercial aircraft, with such a system.

BACKGROUND OF THE INVENTION

Vehicles for transporting a large number of passengers are usually equipped with cabins with passenger seats, one or more on-board toilets and optionally one or more on-board galleys. To increase the seating capacity, the spaces between individual passenger seats can be reduced and, by making on-board toilets and on-board galleys more compact, additional installation space can be created for rows of seats. Particularly regarding making on-board galleys in commercial aircraft more compact, concepts exist in which parking places for trolleys are used where several trolleys are arranged behind one another. This normally applies to the use of trolleys according to the Atlas standard and to the combined use of a full-size trolley and a half-size trolley.

To remove trolleys from such a parking place, a handle located on an upper face is normally gripped by a user and pulled out from the parking place. If a half-size trolley is parked in front of a full-size trolley in a parking place, no great effort is needed to convey the full-size trolley out from the rear parking place in the case of average height.

DE 10 2015 102 315 A1 discloses an arrangement in a cabin of an aircraft with parking places for trolleys, wherein two trolleys can be partially accommodated therein one behind the other.

BRIEF SUMMARY OF THE INVENTION

To make on-board galleys more compact, it could be useful to arrange full-size trolleys behind one another in a single parking place. However, this is not possible in practice since a rear trolley can only be reached with great difficulty by cabin crew, the reason being that it is located at a relatively great distance from an insertion opening of the parking place.

An aspect of the invention proposes a device or an on-board galley with which trolleys arranged behind one another in an on-board galley are easy for cabin crew to handle, such that in particular trolleys arranged at the back in a parking place can be reached as easily as possible.

A stowage and removal system for rollable containers in a vehicle is proposed. The system has a receiving frame with an insertion opening for insertion and removal of a container and with a first wall lying opposite the insertion opening; at least one first locking device for releasably locking a container arranged in the receiving frame at the first wall; a first control element for actuating the at least one first locking device; a removal device with a first engagement body which can be brought into engagement with a side of a container directed towards the first wall, wherein the removal device is configured to move the first engagement body from a region near the wall in the direction of the insertion opening; and a removal control element which is coupled to the removal device for selectively moving the first engagement body. The first control element and the removal control element are arranged in a region of the insertion opening.

The receiving frame serves to provide geometrically defined parking places for the containers in question. The receiving frame can be configured in the form of a separate component which can be placed autonomously in the vehicle. However, the receiving frame is preferably part of a larger facility in the vehicle. Particularly in an aircraft, it is recommended that the larger facility is an on-board galley or another cabin monument in which a suitable installation space is created. The form and accessibility of the receiving frame is not important with regard to the invention, as long as the insertion opening permits the insertion or introduction of a container to be stored therein. Moreover, the word "frame" is not intended to signify that the frame has a skeletal structure, and instead it can also involve a combination of several two-dimensional components. The frame is therefore to be understood as a base for the construction of the system.

The first wall lying opposite the insertion opening is a rear boundary of a parking place in the receiving frame, against which wall a rearmost container bears or comes into abutment. The size and shape of the container can be chosen depending on the requirements in the vehicle. If the vehicle is realized as a commercial aircraft, it is recommended to use trolleys according to relevant standards, for example the Atlas standard. Moreover, the advantages according to the invention are particularly great when the rollable containers have a depth measurement of more than 30 to 40 cm.

The first locking device can fix the container in its position abutting against the first wall and can have, for example, a first locking element. The latter is configured in any desired way that permits simple locking and easy release for removal of the container in question. The locking can be effected in particular by a movable bolt element which acts with form-fit engagement and which corresponds to or is configured corresponding to a corresponding shape feature of the container, for example an outer edge or a depression.

The control element, which is connected to the first locking device, can in particular be arranged on a side of the frame directed towards the user. It is thus made very easy for a user to release the locking device or to ascertain the current state of locking. The specific configuration of the control element can depend on the nature of the locking device. Pulling, pushing and rotating elements are recommended which, by way of a linkage or another facility, transfer a desired axial, rotational or combined axial and rotational movement to the first locking device.

A core aspect of the stowage and removal system according to an embodiment of the invention is the removal device. By means of the latter, a container located at the first wall can be moved in the direction of the insertion opening when the first engagement body is in engagement with the container and the first locking device is released. By actuating the removal control element, which is coupled to the first engagement body, the user can therefore easily reach the container spaced apart from the insertion opening and located at the first wall and can move this container to the insertion opening. It is not necessary to take hold of the container from the direction of the insertion opening, nor is it necessary to use a separate pulling hook or the like in order to manually grip the container.

At the same time, the removal device, through the engagement of the first engagement body, is able to move a container pushed into the receiving frame to the first wall. Preferably, the removal device can be used to exert not only a pulling force but also a pushing force on the container, in order to move the latter towards the insertion opening or towards the first wall.

The frame can therefore be filled very conveniently with large, rollable containers and, particularly when used in a cabin of a commercial aircraft, allows trolleys to be accommodated in a spatially economic manner behind one another in a single parking place.

Therefore, in a preferred embodiment, the receiving frame is configured for receiving at least one pair of containers arranged one behind the other. After conventional removal of a front container which is arranged at the insertion opening, use of the removal device makes it possible to remove the rear container which is arranged at a clear distance from the insertion opening and in the interior of the receiving frame. It would also be conceivable even for three containers to be arranged behind one another in order to move these out of the receiving frame by said means. For this purpose, if so desired, a second removal device for a rear or a middle parking place could be used whose dimensions are adapted to the situation.

An advantageous embodiment moreover has at least one second locking device for releasably locking a container arranged in the receiving frame and protruding towards the insertion opening. Consequently, both containers arranged in the receiving frame in question can be locked.

In an advantageous embodiment, the at least one first locking device has at least one first movable bolt which is movable on an upper face of the receiving frame between a deactivation position and an activation position, wherein the at least one first bolt, in the activation position, forms a limit stop for an end of a container opposite the first wall and, in a deactivation position, removes the limit stop. Consequently, the container abutting against the first wall is held in its parking position by virtue of the fact that the at least one first bolt of the at least one first locking device engages together with the first wall around the container and thereby prevents its mobility in a direction from the first wall towards the insertion opening. The position of the at least one first bolt of the at least one first locking device therefore depends on the depth measurement of the container that is arranged at the first wall. Moreover, by means of the at least one bolt in the activation position, a container introduced between the insertion opening and the container lying at the first wall can also only be inserted as far as the first bolt. Consequently, if a front container located at the insertion opening is exclusively inserted into the receiving frame and the at least one first locking device is activated, the mobility of the container located at the insertion opening is greatly limited.

In this respect, it is expedient to provide at the insertion opening a second locking device which effects a locking of the front container in a similar way, that is to say with at least one second bolt. Such an arrangement with rotatable bolts directly above the insertion opening is known from the prior art.

In an advantageous embodiment, the removal control element is coupled to the first engagement body via a linkage. The first engagement body can preferably be coupled to the removal control element by a single rigid rod such that, when the removal control element is pulled, the first engagement body follows this movement directly. If a non-manual movement of the first engagement body were to be considered, a slightly more complex linkage could also be provided in which at least one directional deflection takes place. This can entail a movement of an actuator located in the receiving frame being converted in a desired manner into a pulling or pushing movement of the container in question.

It is advantageous to configure the engagement device in such a way that, by moving the removal control element to an activation position, an engagement between the first engagement body and the container is effected and, by moving the removal control element to a deactivation position, the engagement is cancelled. Depending on the configuration of the first engagement body, an engagement between the first engagement body and the container in question could be produced, for example, by rotation of the removal control element or by actuation of a button or pulling element. By releasing the engagement, the removal device in the parked position is not loaded by any mass and inertial forces of the container. When the first engagement body is engaged, the removal control element can be pulled in a direction which lies on the connection axis between the first wall and the insertion opening, such that the engaged first engagement body then follows the container to the insertion opening. It is self-evident that the first locking device is deactivated in the process.

It is advantageous if the first locking device is coupled to the removal device such that, upon activation of the removal device, a deactivation of the first locking device takes place and, upon deactivation of the removal device, the activation of the first locking device takes place. The coupling depends in turn on the nature and configuration of the first locking device and of the removal device. If both devices have a rotational movement, it is recommended that both devices are coupled via a torque-transmitting means, for example a toothed gear, chain transmission or belt transmission. If both devices are subject to a pushing or pulling movement of a button, toggle or the like, it is recommended to use a linkage. Of course, the first locking device and the removal device can also be configured separately from each other.

The first engagement body preferably has a first elongate projection on a rod that is rotatable by the removal control element, wherein the first elongate projection can be deflected, by rotation of the rod, towards the container or into a depression of the receiving frame directed away from the container. For example, when the removal device is arranged on an upper face of the container, the use of an elongate projection can provide a reliable and mechanically very simple possibility of forming a limit stop with a shape feature of the container, by which a pressure force can be applied to the container in order to initiate the rolling movement.

In a further preferred embodiment, the first engagement body has a second, curved projection on the rod, wherein the second projection is spaced apart from the first elongate projection and can be deflected, by rotation of the rod, towards the container or into a depression of the receiving frame directed away from the container, and, wherein when the second projection is deflected in the depression, said second projection protrudes partially from the depression. Through the use of two projections spaced apart from each other, it is possible, for example, for a grip bar of a trolley or of a similar container to be enclosed, such that a force can be applied to the container that acts both towards the insertion opening and also towards the first wall, i.e. a pulling force and a pushing force. Through the protrusion of the second projection, a mechanical limit stop between the second projection and a container located in the receiving frame can be brought about, by which an exact positioning of the first engagement body on the provided shape feature of the container takes place. This shape feature can be, for example, a bar-shaped handle of a container configured as a trolley. If this strikes against the second projection, the first projection spaced apart from the second projection is in a suitable position at the opposite side of the bar-shaped handle, in order to bring the first engagement body, by rotation, into engagement with the handle, i.e. to enclose the latter with both projections. Of course, this configuration is also suitable for other shape features, for example lateral or upper flanges, projections, edge regions and others.

The rod between the removal control element and the first engagement body can be mounted displaceably in an elongate guide mechanism such that, after rotation of the removal control element for producing an engagement between the first engagement body and the container, the latter can be very easily pulled out of the receiving space. In a simple case, the guide mechanism could be configured as an elongate depression in which the rod is prevented from falling out by holders, bushes, a covering or the like. Alternatively, a ball guide or roller guide can also be provided, by which the removal device is very easily linearly movable.

Advantageously, the receiving frame comprises a lateral wall, wherein the removal device is arranged on the lateral wall. The removal device is preferably arranged on an inner side of the lateral wall, i.e. on a side that faces the container to be inserted or removed. Preferably, the removal device is based on a rod-like element that is slidably supported. It may be arranged inside an elongate bumper, which is arranged substantially in a horizontal orientation on the lateral wall and is used for protecting the lateral wall from mechanical damages caused by the container. As an alternative, the removal device may be supported in an elongate profile that has dimensions comparable to an elongate bumper. Hence, the elongate profile may replace a common bumper and house the removal device. Placing the removal device on a lateral wall leads to preventing the provision of slots or slits inside a wall or an underside of a working surface.

In a further advantageous embodiment, the removal device comprises a second engagement body as the first locking device at a distance to the first engagement body, wherein the first engagement body and the second engagement body enclose an angle of substantially 90°. The distance between the first engagement body and the second engagement body may be substantially equal to the length of a container to be placed in the receiving frame. Hence, a container may not only be removed by the removal device, but may also be pushed into the receiving frame through the action of the second engagement body. Since both engagement bodies enclose an angle of substantially 90°, the removal device may be moved between two positions, in which either the first engagement body or the second engagement body provides an engagement with the container. Due to the use of two separate engagement bodies they may be designed in a simple manner. For example, one or both of the engagement bodies may be designed in the form of an elongate protrusion.

Preferably, the receiving frame has an upper boundary face in which a depression portion is arranged into and out of which the removal control element can be introduced and removed by pivoting. When a front container located at the insertion opening is pulled out of the receiving frame, a part of the upper boundary face lying above it is freed. There, the depression portion can be arranged in which the removal control element is positioned. The latter can be grasped in order to rotate it from a horizontal deactivation position to an activation position arranged at an angle to the latter. The actuation of the removal control element can therefore only take place when the front container is removed from the receiving frame.

Through the rotation of the removal control element, a corresponding movement of the first engagement body takes place such that an engagement between the first engagement body and the rear container is effected. A user can then pull the removal control element forwards out of the receiving frame via the insertion opening.

Preferably, between the depression portion and the insertion opening, an elongate depression is arranged whose width corresponds to a thickness of the removal control element, in such a way that the removal control element is movable through the elongate depression when it has been pivoted to the activation position. This provides additional guiding of the control of the removal device, which prevents the movement of an only partially grasped container.

It may be expedient for the removal control element to be realized as a ring-shaped grip or as a grip arranged at an angle on the rod. By recessing the removal control element in the depression of the upper boundary face in the deactivation position, the position of the removal control element can be secured. It is additionally conceivable that the removal control element or the removal device as a whole locks in this position. The user then feels and hears that the removal device is in a deactivation position.

The invention further relates to a vehicle with a cabin and, located therein, a cabin monument which has a stowage and removal system according to the above description.

BRIEF DESCRIPTION OF THE DRAWINGS

Further features, advantages and possible uses of the present invention will emerge from the following description of the exemplary embodiments and from the figures. Here, all of the features described and/or illustrated in the figures, individually and in any desired combination, form the subject matter of the invention even independently of their composition in the individual claims or the back-references thereof. Furthermore, in the figures, the same reference signs are used for identical or similar objects.

DETAILED DESCRIPTION

Figure 1:
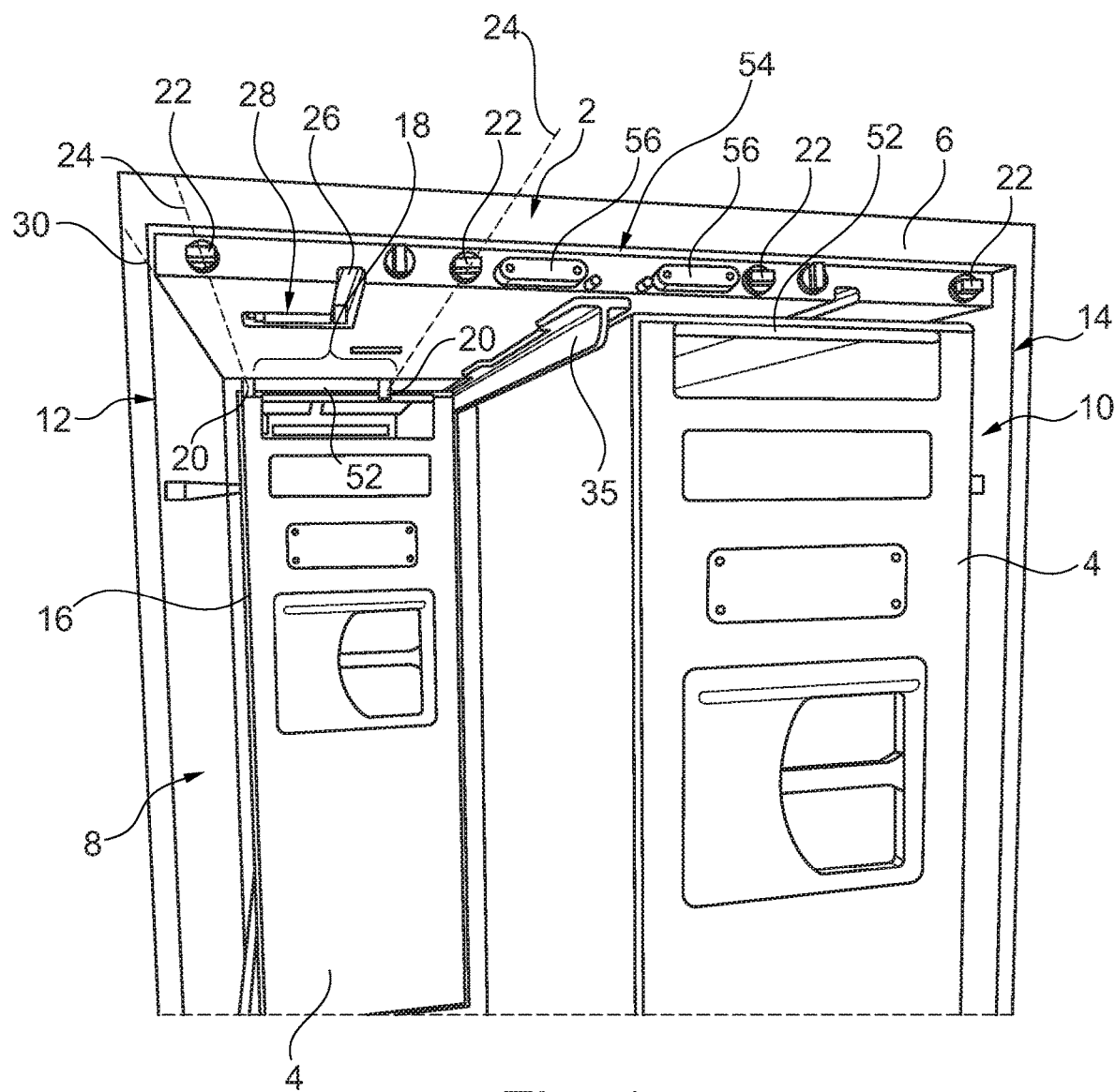
FIG. 1 shows a perspective front view of the stowage and removal system.

FIG. 1 shows a front view of a stowage and removal system 2 for rollable containers 4 in a vehicle. For example, the vehicle in this exemplary embodiment is a commercial aircraft, and the rollable containers 4 are therefore configured as trolleys according to the Atlas standard. They are what are called full-size trolleys, i.e. trolleys with a total depth of approximately 80 cm.

For example, the system 2 has a receiving frame 6 with an arrangement of two receiving spaces 8 and 10, which are each equipped with an insertion opening 12 and 14, respectively. All of the statements below apply to all conceivable receiving spaces.

In the left-hand receiving space 8 in the drawing plane, an individual trolley 4 is arranged which is driven onto a first wall 16 arranged opposite the insertion opening 12. The trolley 4 thus forms the rearmost container 4 in this receiving space 8.

A first locking device 18 in the form of two first bolts 20 is located on an upper face of the receiving space 8. By moving the first bolt 20 between a deactivation position and an activation position, the container 4 can be arrested or freed according to requirements. In an activation position, the first bolts 20 extend downwards from the upper face of the receiving space 8 or of the receiving frame 6 and intersect with the overall height of the trolley 4, such that the upper face thereof is enclosed between the first wall 16 and the deployed first bolts 20. In a deactivation position (not shown), the trolley 4 is freed. For this purpose, the first bolts 20 can be removed from the position shown in FIG. 1 in a translation movement, a rotation movement or a combined movement.

By means of a first control element 22, the left-hand first bolt 20 in the drawing plane can be rotated for example about a horizontal bolt axis 24. The bolt axis 24 is shown for example by a broken line and is realized by a connection of the first control element 22 and of the first bolt 20 via a rod-shaped connection element (not shown). The rotation of the first control element 22 consequently leads to a rotation of an upper end (not shown in FIG. 1) of the bolt 20, such that the latter can disappear into a depression of the upper boundary face of the receiving space 8. Analogously to this, the right-hand first bolt 20 in the drawing plane can be moved by a right-hand first control element 22 in the drawing plane. For this purpose, a connection is likewise expedient along a horizontal bolt axis 24.

On the upper face of the receiving space 8, a depression 26 is moreover shown which extends rectilinearly along the main axis of extension, i.e. a connection axis between the first wall 16 and the insertion opening 12, in the direction of the first wall 16 and ends there in a slightly enlarged depression portion 28.

Figure 2:
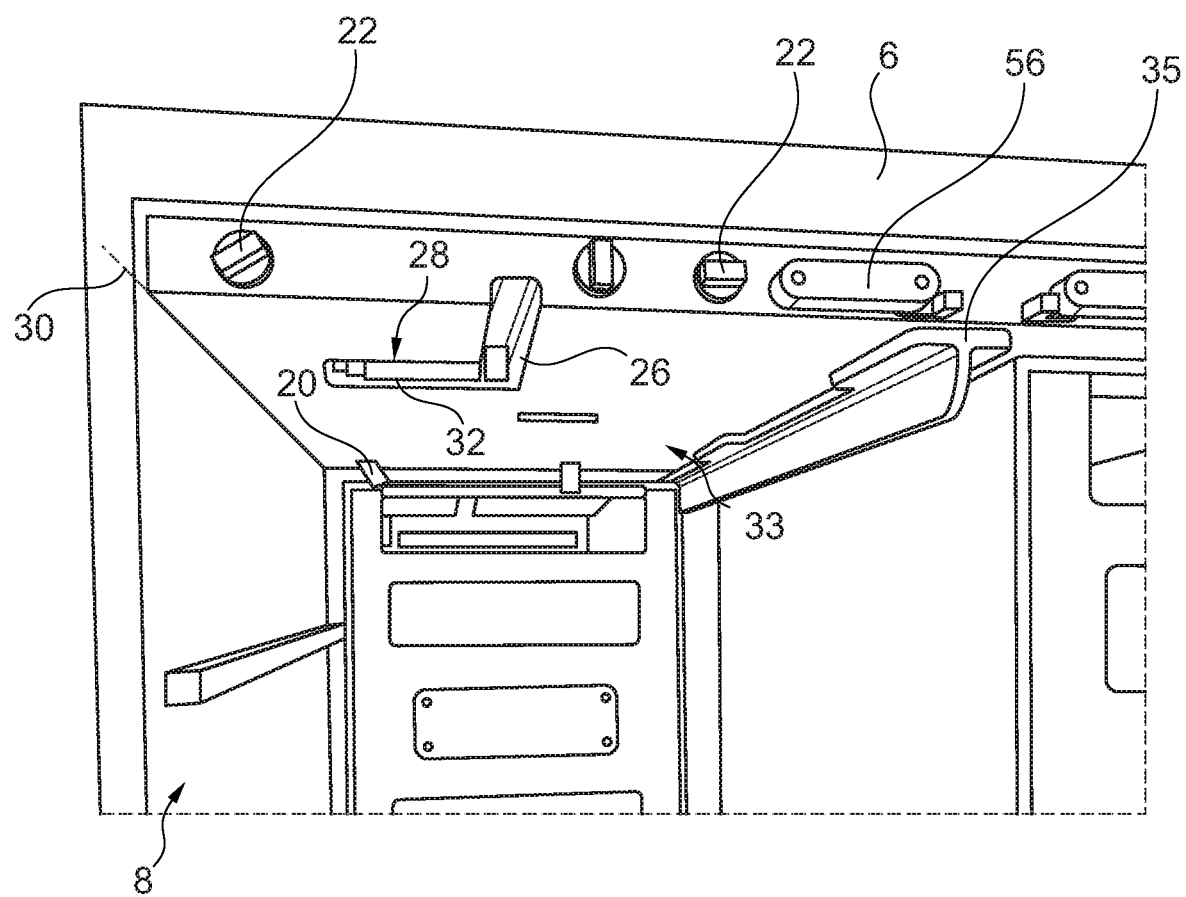
FIG. 2 shows a detailed view of one of two parking places shown in FIG. 1.

This is shown more clearly in a slightly enlarged view in FIG. 2. Here, the elongate depression 26 is positioned more or less centrally in the receiving space 8 and for example extends by half the length of a trolley 4 or slightly less in the direction of the first wall 6. The orientation of the elongate depression 26 is substantially parallel to the bolt axes 24 and to boundary edges of the frame 6, for example an inner boundary edge 30 at an upper face of the receiving space 8. The enlarged depression portion 28 can have approximately the shape of a rounded quadrilateral as basic shape, which extends laterally outwards from the elongate depression 26. This is therefore arranged eccentrically on the upper face of the receiving space 8.

In the illustrative embodiment shown, the left-hand receiving space 8 is separated from the right-hand receiving space 10 by a web 35 which is arranged on an upper face of the frame 6 and is located there likewise parallel to a main direction of extent.

FIG. 2 additionally shows an initial rotation of the left-hand first control element 22, the movement of which is followed by the left-hand first bolt 20.

A handle 32 of a removal device 33 is arranged as a removal control element in the enlarged depression portion 28. This is shown in the figures below.

Figure 3A:
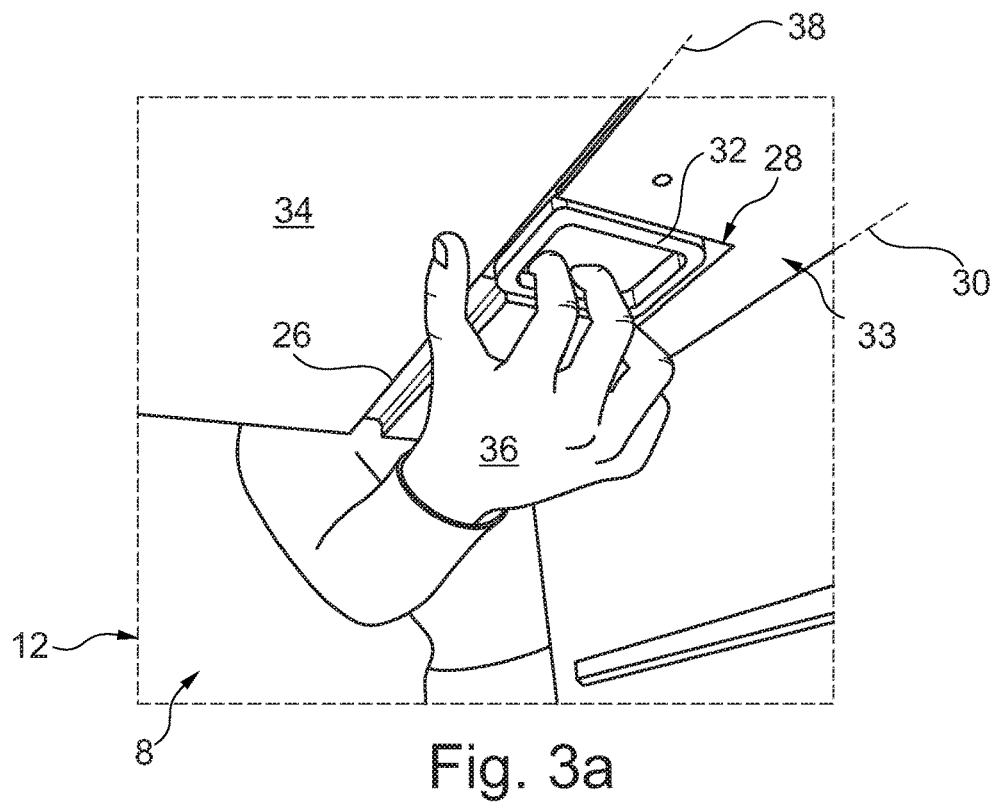
FIGS. 3a and 3b show handling of a removal control element in detailed views from inside the receiving frame.

FIG. 3a shows an upper face of the receiving space 8 from below. Here, the profile of the elongate depression 26 can be seen which opens into the enlarged depression portion 28. Here, a hand 36 of a user, guided through the insertion opening 12 into the receiving space 8, grips the removal control element 32. The latter is configured for example as a ring-shaped grip with a quadrilateral basic shape and rounded corners. The design of the closed removal control element 32 serves to protect the fingers and hand in the event of incorrect operation. The aim is to prevent the fingers from being crushed in the event of an unintended movement of the container 12.

Figure 3B:
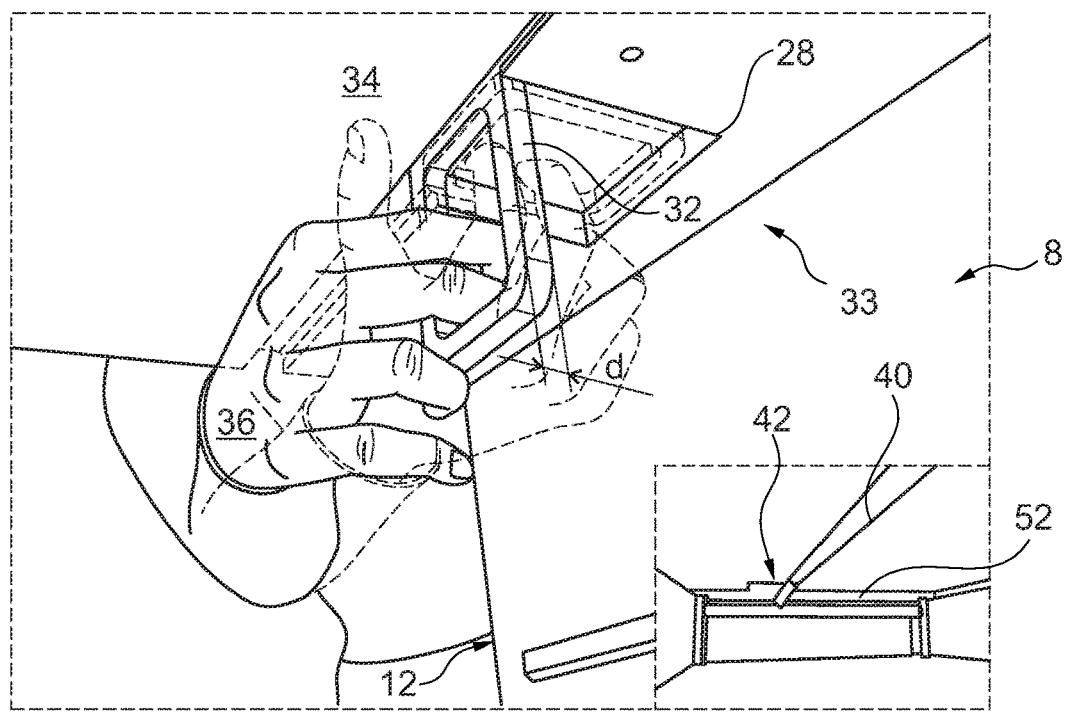

The removal control element 32 is mounted pivotably along a direction of extent 38 of the elongate depression 26. A pivoting movement is shown in FIG. 3b. The removal control element 32 is essentially pivotable through 90° about the direction of extent 38.

The removal control element 32 has a thickness or width d, which is slightly less than the width of the elongate depression 26. In the form folded down from the upper face, the removal control element 32 can consequently fit into the elongate depression 26 and be shifted freely outwards towards the insertion opening 12.

Figure 4A:
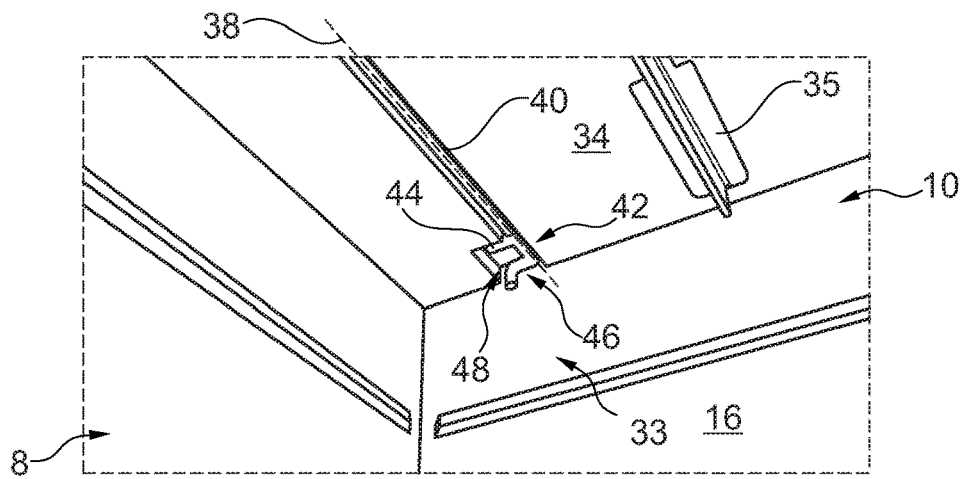
FIGS. 4a to 4c show the movement of a first engagement body inside the receiving frame.
Figure 4B:
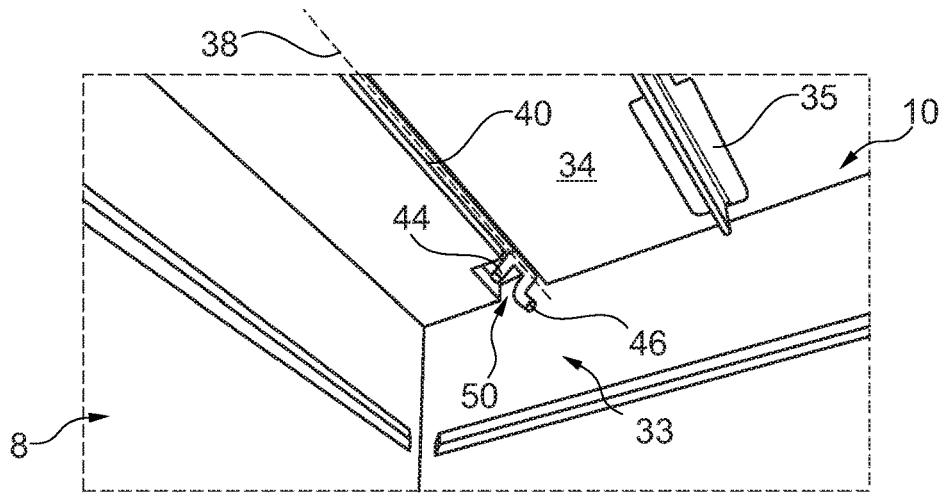
Figure 4C:
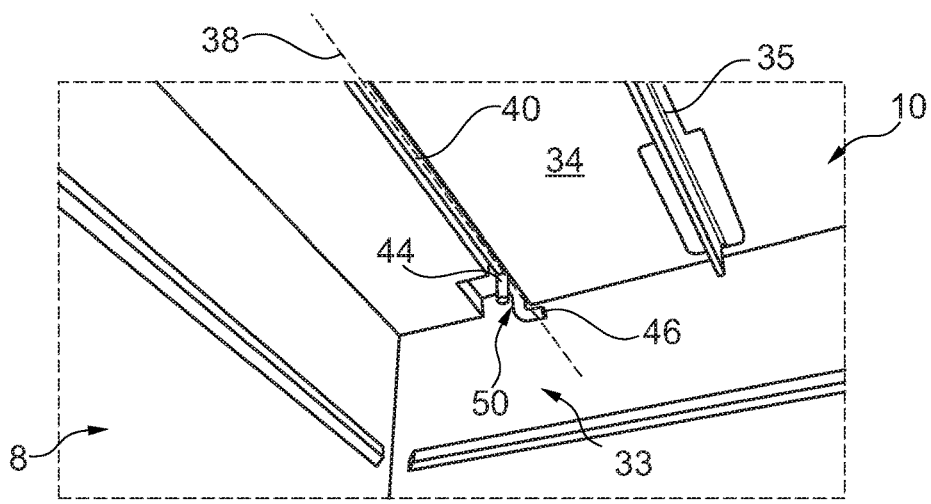

As can be seen in a partial detail in FIG. 3b, the removal control element 32 is connected to a rod 40 which extends inside the upper face 34 of the receiving space 8 in the direction of the first wall 16. A rotation of the removal control element 32 leads to a twisting of the rod 40. The function of this rod is shown in FIGS. 4a to 4c.

Here, the rod 40 is shown in a region on the first wall 16. There, a first engagement body 42 is arranged which is composed of a first projection 44 and a second projection 46. By rotation of the rod 40, the first engagement body 42 can be pivoted at least to a large extent into an engagement body depression 48 or pivoted out therefrom.

The first projection 44 is configured as an elongate projection, which extends substantially perpendicular to the rotation axis 38. In FIG. 4a, it is arranged in a deactivation position completely within the engagement body depression 48. By rotation of the removal control element 32, it can be brought to a position in which it is pivoted through 90° and in which it protrudes vertically downwards from the upper face 34, that is to say towards a container 4 or into the receiving space 8. This is shown in FIG. 4c. FIG. 4b shows the transition between a deactivation position in FIG. 4a and an activation position in FIG. 4c.

The second projection 46 is likewise arranged perpendicular to the rod 40 but has a curvature of approximately 90° about the rotation axis 38. This has the effect that, in the deactivation position in FIG. 4a, it protrudes slightly from the engagement body depression 48. Upon rotation of the rod 40 through approximately 90°, it is driven completely out of the engagement body depression 48 and reaches the position illustrated in FIG. 4c.

Enclosed between the projections 44 and 46 is a gap 50 whose size corresponds to a handle 52 of a container 4 (see detail in FIG. 3b). This means that, after rotation of the removal control element 32 to an activation position (see FIGS. 3b and 4c), the handle 52 of a container 4 located on the first wall 16 is gripped between both projections 44 and 46 and, by pulling the removal control element 32 through the elongate depression 26, a tensile force is exerted on the handle 52 and thus on the trolley 4. By the provision of two projections 46 and 44, a reverse movement, that is to say into the receiving space 8, can also be permitted.

This also explains the shape of the second protrusion 46 which, in a deactivation position, still protrudes from the upper face 34 and thus leads to the handle 52 striking the second protrusion 46. When the removal control element 32 is rotated, the handle 52 is thus safely reached.

In addition, this function can also be performed in the widened portion 28 of the depression. When the two protrusions 44 and 46 reach this depression portion 28, the removal control element 32 can be shifted into the horizontal deactivation position. A trolley 4 inserted into the receiving space 8 thus abuts with the inner handle 52 against the second protrusion 46, which is clearly perceptible by touch to a user. When this state is reached, the handle 52 can be gripped by rotating the removal control element 32 to a vertical position, and the trolley 4 can consequently be shifted as far as the first wall 16 of the receiving space 8.

Figure 5A:
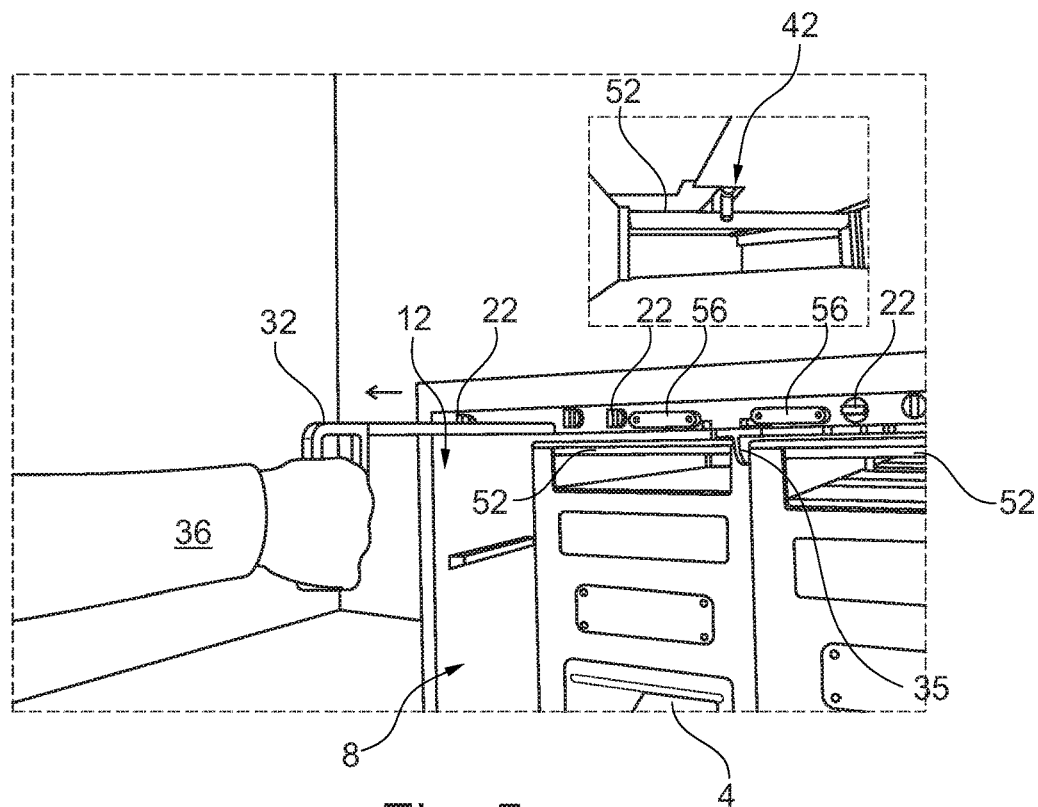
FIGS. 5a and 5b show the handling of the removal device, with the removal control element pulled out of the receiving frame.
Figure 5B:
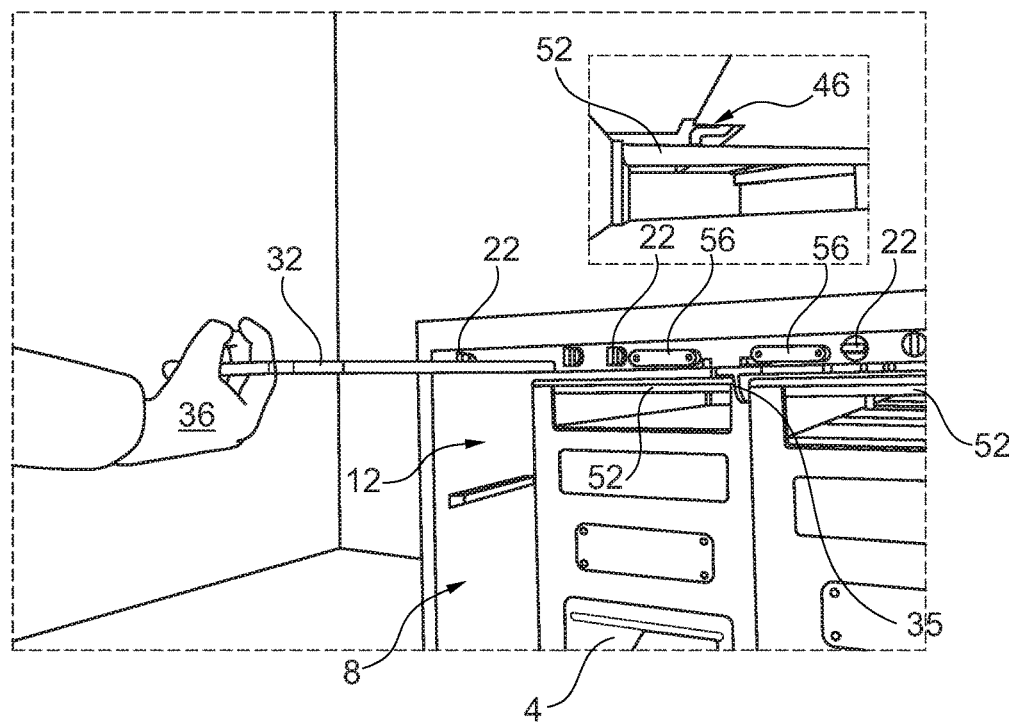

FIGS. 5a and 5b show a trolley 4 moved to the insertion opening 12. FIG. 5a shows by way of example that a user has pulled a rear trolley 4 towards the insertion opening 12 by pulling the removal control element 32. Here, the handle 52 is in engagement with the first engagement body 42. In FIG. 5b, the removal control element 32 is shown in a horizontal position in which exclusively the second projection 46 protrudes into the receiving space 8. The trolley 4 is located with its handle 52 in abutment with this projection 46 such that, by subsequent rotation of the removal control element 32, the handle 52 can be gripped in order to move the trolley 4 back to the first wall 12. In the position shown in FIG. 5b, removal of the trolley 4 from the receiving space 8 is of course possible.

To secure a front trolley located in the receiving space 8, a second locking device 54 is provided which can be realized in the form of a rotatably mounted second bolt 56. After a rear trolley 4 has been arrested at the first wall 16, a further trolley 4 can be inserted into the receiving space 8 and arrested similarly, that is to say by activation of the second locking device 54.

By means of the components shown, a simple yet very effective stowage and removal system can therefore be realized which can greatly enhance the compactness of an on-board galley or other facilities, since a parking place for trolleys or the like can be filled with several trolleys arranged behind one another, without having to take account of limitations that result from the handling by a user of average height.

FIGS. 6a to 6f show another system 58 for stowing and removing a container. Here, a lateral wall 60 is shown, which delimits the receiving space 8 at a lateral side. At a certain height, an elongate bumper 62 is attached, which runs substantially parallel to an underside 64 of the lateral wall 60. In a certain vertical distance thereto, a removal device 66 with a handle 32 is arranged. It comprises an elongate profile 68, which is attached to the lateral wall 60 and which extends/projects from the lateral wall 60 about the same distance as the bumper 62. Hence, the elongate profile 68 has a shape that is equivalent to the shape of the bumper 62.

The profile 68 may have a slot 70 along its length, as visible in a sectional view A-A. the removal device 66 may be based on a rod 72 having a circular cross-section, such that the removal device 66 may be moved along the extension of the profile 68 and may also be rotated therein. The removal device 66 comprises a first engagement body 74 at an end opposed to the handle 32. As shown in all FIGS. 6a to 6f it always has a horizontal orientation despite the orientation of the handle 32. This may be achieved by separating a rear section 78 of the removal device 66 and by attaching the rear section 78 to a forward section 80 in such a manner that it is rotatable and capable of transferring axial forces.

Figure 6A:
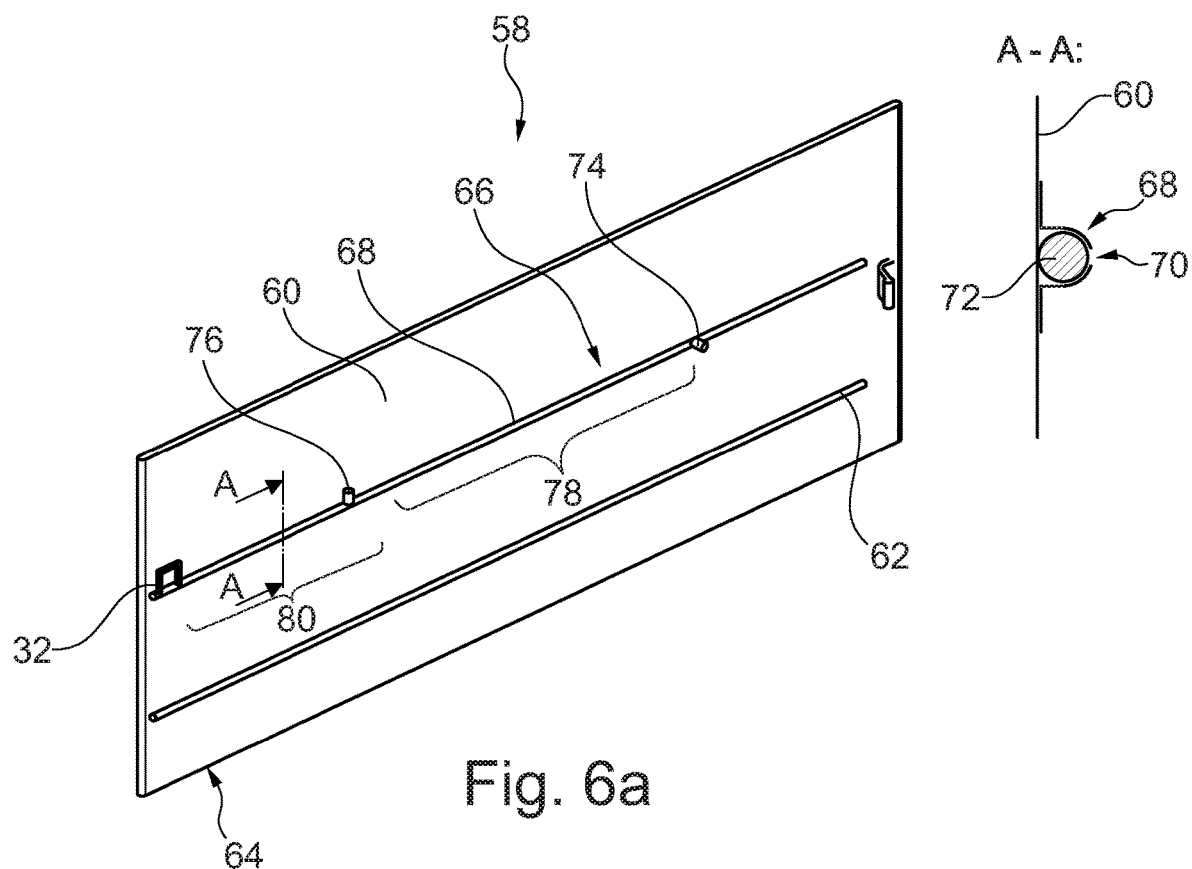
FIGS. 6a to 6f show a further exemplary embodiment of the stowage and removal system.

In FIG. 6a, a second engagement body 76 has the same orientation as the handle 32 and is arranged between the handle 32 and the first engagement element 74. The second engagement element 76 acts as the first locking device 18, while the handle 32 acts as the first operating element 22 mentioned further above and as explained further below.

Through the handle 32, both the first engagement body 74 and the second engagement body 76 can be moved along the extension of the profile 68. In the shown arrangement, a container 4 in the form of a trolley can be placed into the receiving space 8 and can be pushed onto the first engagement body 74. This is shown in FIG. 6b.

The handle 32 is mechanically coupled with the second engagement body 76 such that the orientation of the second engagement body 76 can be changed. While in FIGS. 6a and 6b the handle 32 is in an upright position, it is rotated to a horizontal position in FIGS. 6c and 6d. The orientation of the second engagement body 76 follows this orientation. For this, the profile 68 may comprise a slot 82, which is arranged substantially vertical to the slit 70. Hence, the second engagement body 76 can move from a vertical orientation to a horizontal orientation. Subsequently, it may be moved along the slit 70. In doing so, the container 4 is pushed along the slit 70 further into the receiving space 8. Both the profile 68 and the bumper 62 protect the lateral wall 60 from damages and guide the container into the receiving space 8.

Figure 6B:
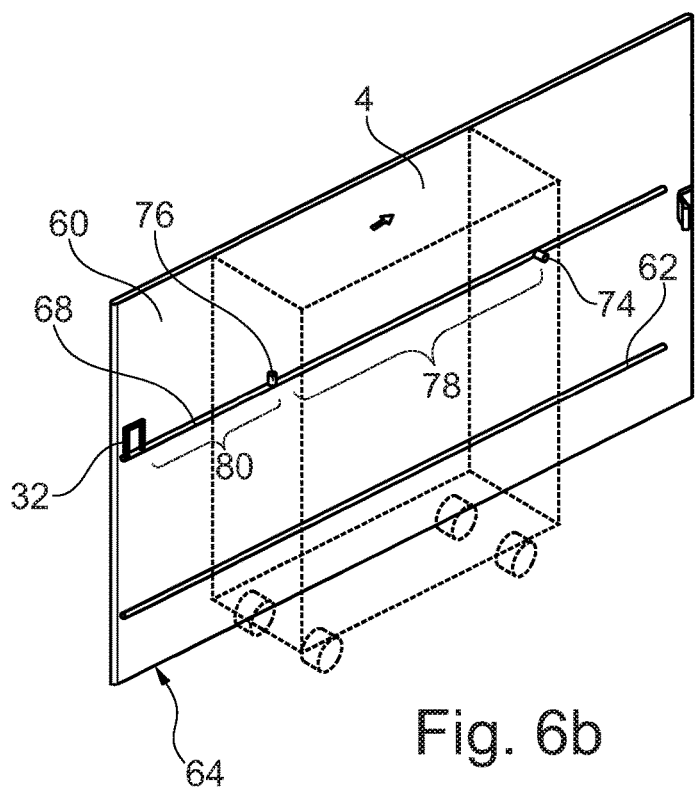
Figure 6C:
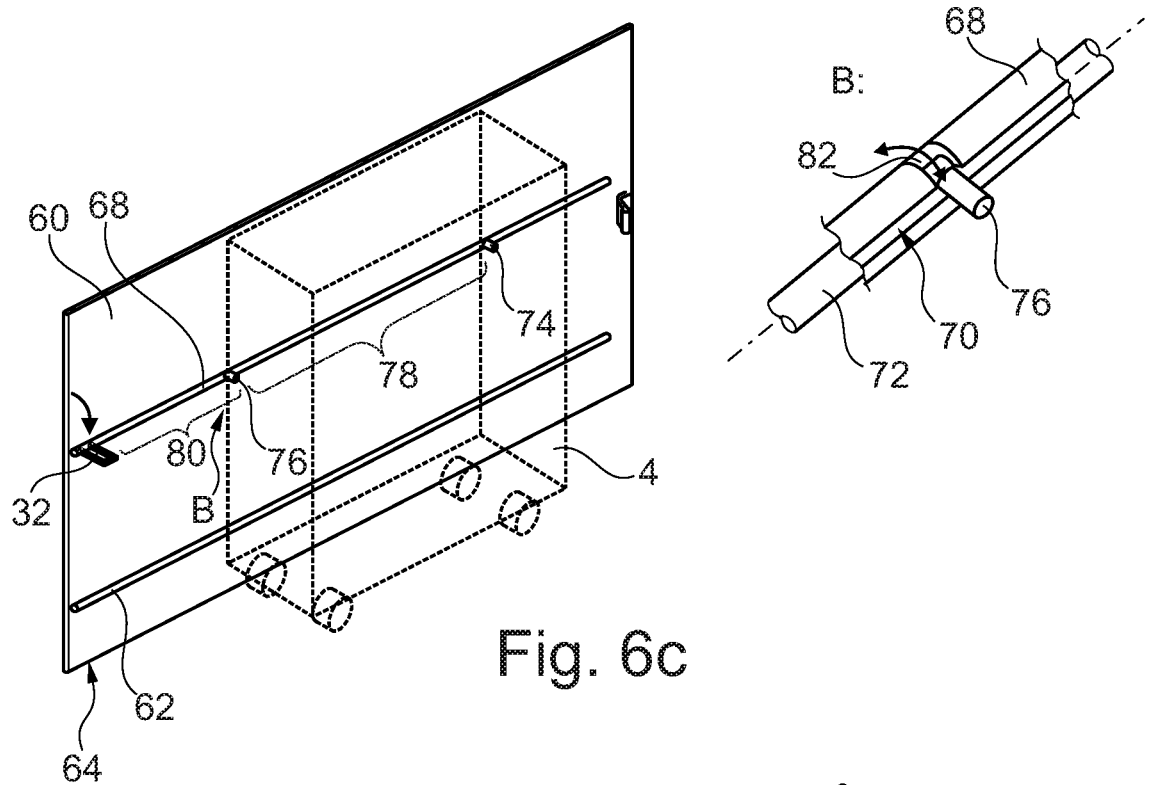
Figure 6D:
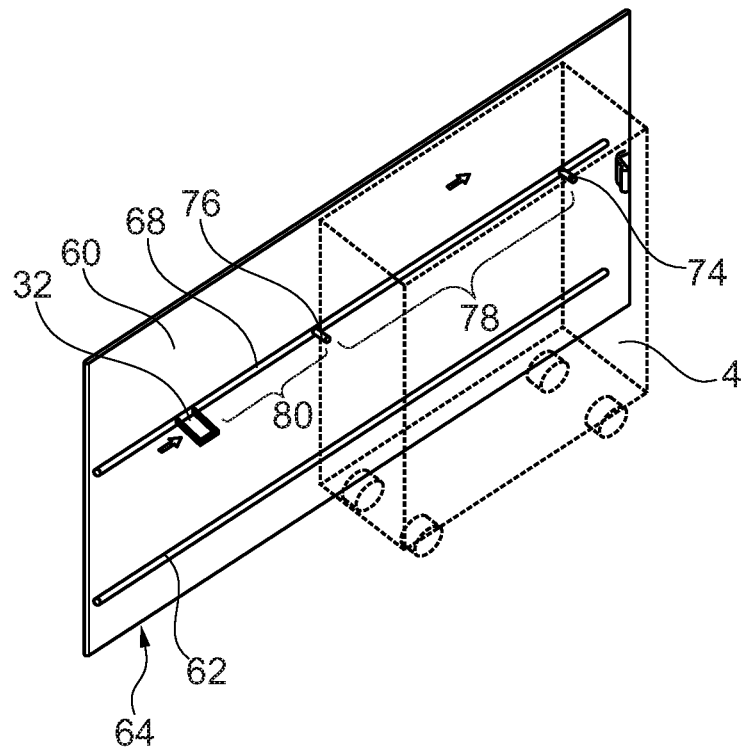
Figure 6E:
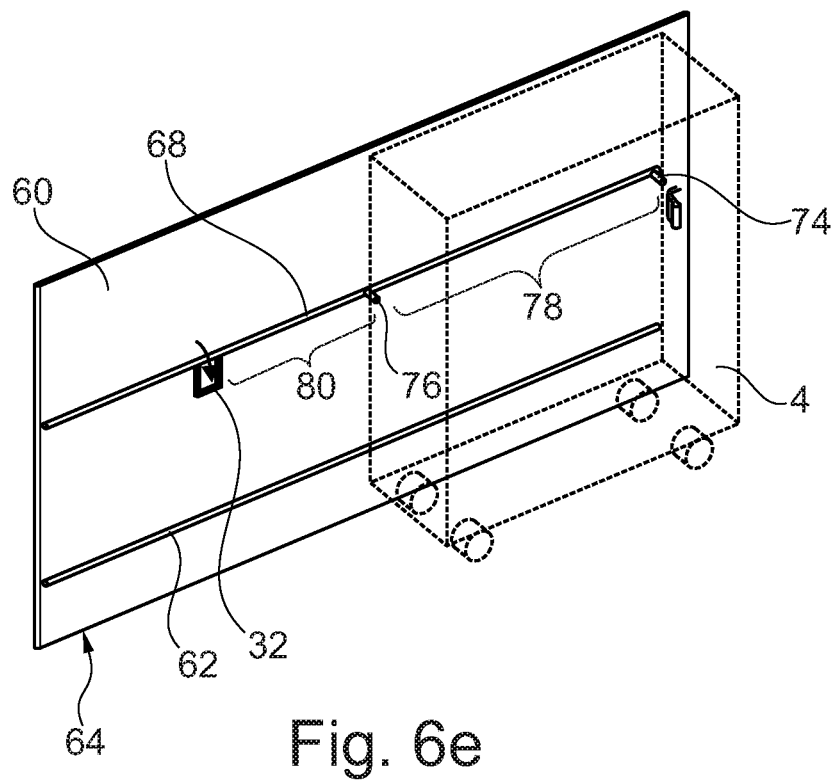
Figure 6F:
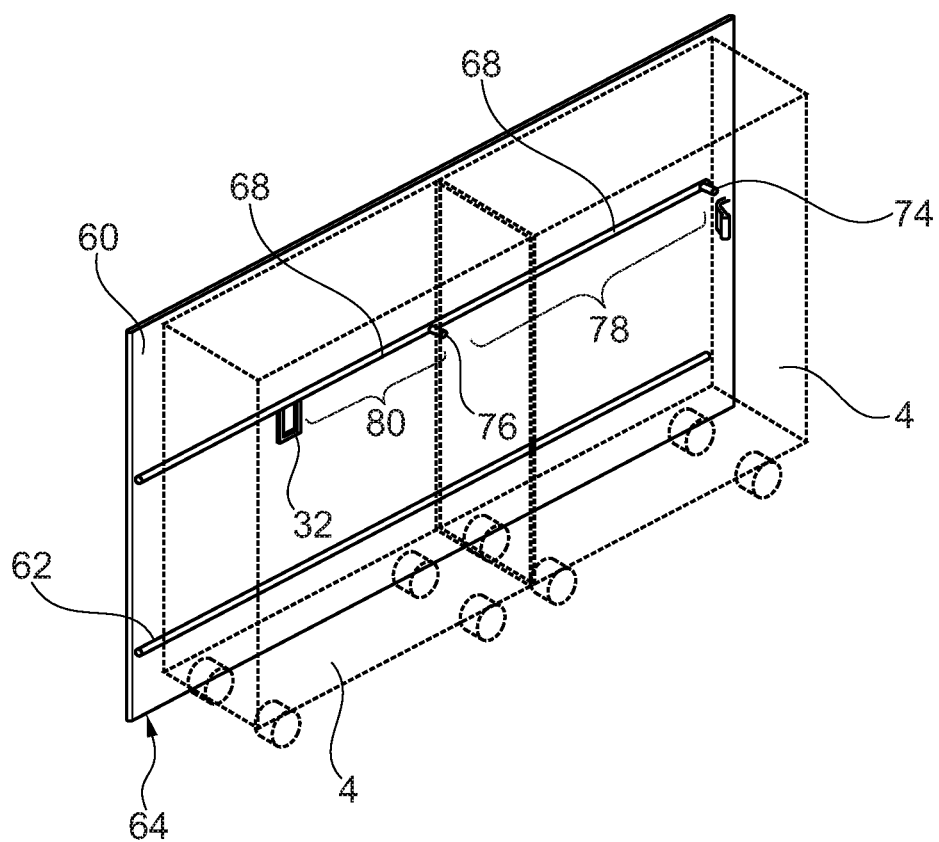
Figure 7:
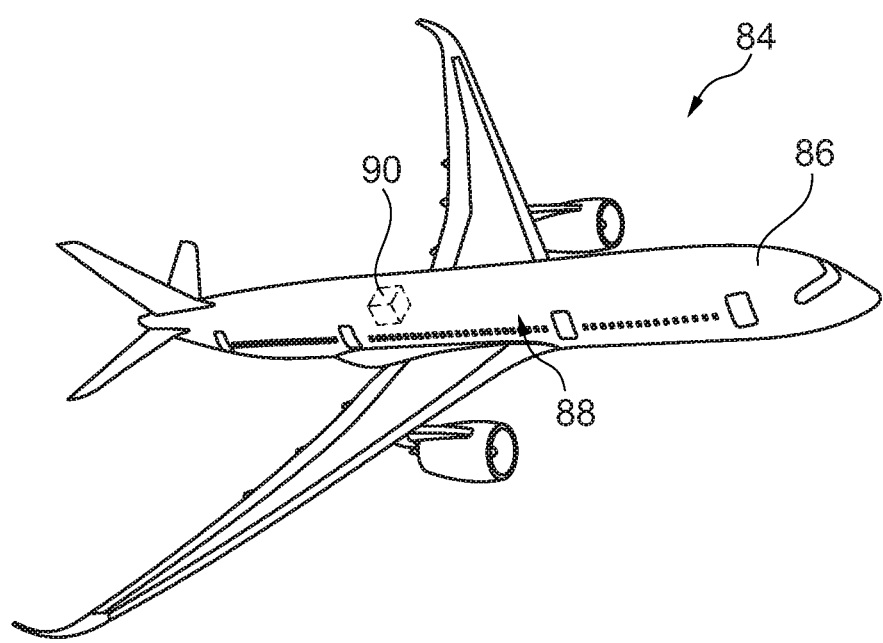
FIG. 7 shows an aircraft with a cabin in which a monument with such a stowage and removal system is arranged.

As shown in FIGS. 6e and 6f, the handle 32 may be further rotated to be placed in a vertical orientation at a position 180° to the position shown in FIGS. 6a and 6b. However, the second engagement body 76 remains in the horizontal position. This may be achieved by providing a torque-transferring connection between the handle 32 and the second engagement body 76, which is capable of allowing a slight rotation between the handle 32 and the second engagement body 76. This may be achieved by a rotary spring arranged in the mechanical chain between the handle 32 and the second engagement body 76 that allows a certain flexibility in the rotational position. Also, the slit 70 permanently holds the second engagement body 76 in the horizontal position and only allows it to swivel into an upright position if it is placed in a slot 82. In the position shown in FIGS. 6e and 6f, the container 4 is placed in a rearward position and is held be both engagement elements 74 and 76 in its position.

However, due to the handle 32 being swiveled downwardly, an additional container 4 may be inserted and moved up to the second engagement body 76. This is illustrated in FIG. 6f. This additional container 4 may be latched by a latch 56, as illustrated in the previous exemplary embodiment.

It may be possible to provide a spring unit (not shown), which urges the handle 32 into the downwardly oriented position of FIGS. 6e and 6f, such that it must actively be moved into the horizontal position for removing the rear container 4. This also ensures that the rear container 4 always remains latched.

Finally, FIG. 6 shows an aircraft 84 with a fuselage 86 and, arranged therein, a cabin 88 in which a cabin monument 90 can be arranged which is equipped with such a stowage and removal system 2.

It is additionally noted that "having" does not rule out other elements or steps, and the words "a" or "an" do not rule out a multiplicity. It is also noted that features that have been described with reference to one of the above exemplary embodiments can also be used in combination with other features of other exemplary embodiments described above. Reference signs in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A stowage and removal system for rollable containers in a vehicle, the system comprising:
   a receiving frame with an insertion opening for insertion and removal of a container and with a first wall lying opposite the insertion opening;
   at least one first locking device for releasably locking a container arranged in the receiving frame at the first wall;
   a first control element for actuating the at least one first locking device;
   a removal device with a first engagement body configured to be brought into engagement with a side of a container directed towards the first wall, wherein the removal device is configured to move the first engagement body from a region near the wall in the direction of the insertion opening, and vice versa; and
   a removal control element coupled to the removal device for selectively moving the first engagement body,
   wherein the first control element and the removal control element are arranged in a region of the insertion opening,
   wherein the receiving frame comprises an upper boundary face comprising a depression configured to accommodate the entire removal control element in a first position of the removal control element, the removal control element having a dimension smaller than an accommodating dimension of the depression, the depression extending along a longitudinal axis, and
   wherein the removal control element is configured to pivot out of the depression in a second position of the removal control element, the removal control element pivoting about the longitudinal axis of the depression.

2. The system according to claim 1, wherein the receiving frame is configured for receiving at least one pair of containers arranged one behind the other.

3. The system according to claim 2, further comprising: at least one second locking device for releasably locking a container arranged in the receiving frame and protruding towards the insertion opening.

4. The system according to claim 1, wherein the at least one first locking device has at least one movable first bolt which is movable on an upper face of the receiving frame between a deactivation position and an activation position, and wherein the at least one first bolt, in the activation position, forms a limit stop for an end of a container opposite the first wall and, in a deactivation position, removes the limit stop.

5. The system according to claim 1, wherein the removal control element is coupled to the first engagement body via a linkage.

6. The system according to claim 5, wherein the linkage is configured as a rigid rod between the removal control element and the first engagement body.

7. The system according to claim 6, wherein the first engagement body has a first elongate projection on the rod, and wherein the first elongate projection is configured to be deflected, by rotation of the rod, towards the container or into a depression of the receiving frame directed away from the container.

8. The system according to claim 7, wherein the first engagement body has a second, curved projection on the rod, wherein the second projection is spaced apart from the first elongate projection and is configured to be deflected, by rotation of the rod, towards the container or into a depression of the receiving frame directed away from the container, and, wherein when the second projection is deflected in the depression, said second projection protrudes partially from the depression.

9. The system according to claim 6, wherein the first engagement body has a second, curved projection on the rod, wherein the second projection is spaced apart from the first elongate projection and is configured to be deflected, by rotation of the rod, towards the container or into a depression of the receiving frame directed away from the container, and, wherein when the second projection is deflected in the depression, said second projection protrudes partially from the depression.

10. The system according to claim 6, wherein the removal control element and the first engagement body are mounted displaceably in an elongate guide mechanism.

11. The system according to claim 1, wherein the removal device is configured, by moving the removal control element to an activation position, to effect an engagement between the first engagement body and the container and, by moving the removal control element to a deactivation position, to cancel the engagement.

12. The system according to claim 1, wherein the first locking device is coupled to the removal device such that, upon activation of the removal device, a deactivation of the first locking device takes place and, upon deactivation of the removal device, the activation of the first locking device takes place.

13. A vehicle with a cabin and, located therein, a cabin monument which has a stowage and removal system according to claim 1.

14. The vehicle according to claim 12, wherein the vehicle is a commercial aircraft.

15. The system according to claim 1, wherein the depression extends rectilinearly along a main axis of extension between the first wall and the insertion opening.

16. The system according to claim 15, wherein the depression extends by half a length of the container.

17. The system according to claim 1, wherein the depression comprises an elongate depression and an enlarged depression portion at an end of the elongate depression, and wherein the enlarged depression portion is arranged on the upper boundary face at a predetermined distance distal from a front face of the receiving frame.

18. The system according to claim 15, wherein the depression comprises an elongate depression and an enlarged depression portion at an end of the elongate depression, and wherein the elongate depression extends rectilinearly and the enlarged depression portion is arranged eccentrically on the upper boundary face.

19. The system according to claim 1, wherein the removal control element is independent of the at least one first locking device.

* * * * *